United States Patent
Kreider et al.

(10) Patent No.: US 9,052,736 B2
(45) Date of Patent: Jun. 9, 2015

(54) CONTROL SYSTEM WITH DISPLACEABLE KNOB

(75) Inventors: Julien Kreider, Soultz (FR); Emilie Collin, Kintzheim (FR)

(73) Assignee: Delphi Technologies, Inc., Troy, MI (US)

( * ) Notice: Subject to any disclaimer, the term of this patent is extended or adjusted under 35 U.S.C. 154(b) by 224 days.

(21) Appl. No.: 13/876,487

(22) PCT Filed: Sep. 26, 2011

(86) PCT No.: PCT/EP2011/066642
§ 371 (c)(1),
(2), (4) Date: Apr. 15, 2013

(87) PCT Pub. No.: WO2012/041798
PCT Pub. Date: Apr. 5, 2012

(65) Prior Publication Data
US 2013/0199901 A1    Aug. 8, 2013

(30) Foreign Application Priority Data

Sep. 29, 2010  (FR) ..................................... 10 57870

(51) Int. Cl.
*H01H 25/06* (2006.01)
*G05G 9/047* (2006.01)
(Continued)

(52) U.S. Cl.
CPC ........... *G05G 9/047* (2013.01); *Y10T 74/20201* (2015.01); *B60K 37/06* (2013.01); *G05G 9/02* (2013.01); *B60K 2350/102* (2013.01); *B60K 2350/1048* (2013.01); *B60K 2350/35* (2013.01); *H01H 25/065* (2013.01)

(58) Field of Classification Search
CPC .................................................... H01H 25/065
USPC ...... 200/6 A, 5 R, 335, 5 E, 178, 50.21, 17 R, 200/43.16, 43.11, 566
See application file for complete search history.

(56) References Cited

U.S. PATENT DOCUMENTS 4,296,773 A    10/1981  Harshman et al.
5,159,706 A *  10/1992  Hodsdon .................... 455/90.3
(Continued)

FOREIGN PATENT DOCUMENTS

DE    19960757    6/2000
EP    1988559     11/2008
(Continued)

OTHER PUBLICATIONS

International Search Report dated Dec. 21, 2011.

*Primary Examiner* — Renee S Luebke
*Assistant Examiner* — Doblade Elliott
(74) *Attorney, Agent, or Firm* — Lawrence Delazettor

(57) ABSTRACT

Control system intended for the choice and the selection of functions in a vehicle, the system comprising a case, a lever extending along a main axis from a first end, mounted pivoting about a pivot axis to a second end provided with an actuation knob, the lever being able to turn about the main axis, and an elastic return device of the lever into a neutral position comprising an action surface in the form of a truncated cone of revolution, the axis of which is the main axis and, on a pivoting of the lever, the active zone is displaced along a generatrix of the cone moving towards the vertex, the elastic means being more biased than in a neutral position.

9 Claims, 5 Drawing Sheets

(51) Int. Cl.
*B60K 37/06* (2006.01)
*G05G 9/02* (2006.01)

(56) References Cited

U.S. PATENT DOCUMENTS 5,350,891 A * 9/1994 Ditzig .................... 200/6 A
8,263,882 B2 * 9/2012 Laurent et al. ......... 200/6 A 2003/0107502 A1   6/2003   Alexander et al.
2006/0125790 A1   6/2006   Edmunds
2009/0050465 A1   2/2009   Asada

FOREIGN PATENT DOCUMENTS

GB        1327175       8/1973
WO        01/69343      9/2001
WO        2004/049092   6/2004

* cited by examiner

CONTROL SYSTEM WITH DISPLACEABLE KNOB

CROSS-REFERENCE TO RELATED APPLICATION

This application claims the benefit under 35 U.S.C. §371 of published PCT Patent Application Number PCT/EP 2011/066642, filed Sep. 26, 2011, claiming priority to French patent application number FR1057870 filed on Sep. 29, 2010, and published as WO2012/041798 on Apr. 5, 2012, the entire contents of which is hereby incorporated by reference herein.

TECHNICAL FIELD OF INVENTION

The invention relates to a control system with displaceable knob used in motor vehicles as a digital control interface.

BACKGROUND OF INVENTION

The multiplicity of controls to which the driver of a modern vehicle has access is such that numerous interfaces are developed allowing activation of the functions without having to look at the control or his hands. The user relies on digital feel alone to control a function and can thus keep his eyes concentrated on the road. Among other digital interfaces, directional knobs placed at the central console between the front seats now concentrate the activation of many controls, in particular the navigation system, the radio, the telephone and all of the telematics functions, as well as control of the ventilation and air-conditioning. To select a function, the user, by means of the knob, directs a cursor on a monitoring screen. Once the desired function has been displayed, the user validates his choice. To do this, and on the basis of experience developed in the field of computers and Internet navigation, different directional knobs have been developed for the motor vehicle environment. The first could only turn and pushbuttons situated around the knob permitted validation of the functions. For more pleasant and more accurate use, the rotation of the knob produces a cyclic force felt by the user.

Subsequently, the peripheral buttons were removed and replaced by extra functions of the directional knob. With the most recent models the user can navigate in menus offered on the monitoring screen by displacing the knob towards the front or the rear, or from left to right, he can still as before, turn the knob on itself and lastly, to validate his choice the user must now press on the knob which acts like a computer keyboard key. Differently from the levers and joystick of videogames, the displacements of the directional knobs for vehicles have very small amplitudes, limited to a few millimeters. Moreover, the displacements must be sure and precise so that the user, concentrated on the driving of the vehicle, easily selects and validates the function which he is seeking. Thus, without any operation, the knob returns by itself into a neutral position, it has no perceptible operating play which would be very unpleasant for the user and its displacements are always accompanied by return forces perceived by the user.

For direct and more rapid selection of certain functions, pushbuttons have sometimes been retained. They can be placed at the immediate periphery of the knob, and then constitute with the knob a general control unit. They can also be distributed in other locations accessible by the driver.

The visible part of the knobs operated by the driver is assembled with a system that can be mechanical comprising a lever, articulation joint, springs, or electronic with integrated circuit, angle sensors, stepped motor.

Mechanical systems are in particular presented in WO 2008/113593 A1, Eckert et al. proposing a mechanical knob pivoting front-rear and right-left simple in design but limited in displacement. A more complex mechanism is proposed by Torrents Gavalda in EP 1426991. It permits in addition the vertical depression of the knob but not the rotation proper of the knob. A third mechanism is proposed by Sato with U.S. Pat. No. 7,368,673 B2 in which the knob can in addition turn on itself. Contrarily to Eckert and to Torrents Gavalda, the front-rear and right-left displacements of the knob of Sato are due to translations and not to pivotings.

A known problem of the proposed mechanisms is associated with the fact that for the great majority of the time the knobs are not operated and remain in the neutral position. The pieces do not move and the contacts occur in the same places. Thus, ageing by non-use causes local deformations that can produce problems with accuracy and the perception of the user. To combat these deformations the use of noble materials and the reduction of forces are the two conventional routes for investigation by mechanics however, neither of these routes has up to now led to an acceptable solution. The strong materials are more costly and generally more difficult to work, while the reduction of forces causes a "limpness" in use and unacceptable inaccuracies with regard to the elastic return or the maintenance of the knob in the neutral position.

Today, electromechanical directional knobs more expensive than the mechanical knobs are fitted to almost all high range vehicles and constitute a considerable market differentiator. However, the functions of GPS, telephone, air conditioning, Hi-Fi, FM radio . . . are now present in virtually all vehicles and their control imposes the generalization of the directional knobs. The expansion of the market then requires control systems which are just as accurate reliable and pleasant to operate as those already in use but which, due to a modified design, are much less expensive.

SUMMARY OF THE INVENTION

The present invention resolves the problem mentioned above by proposing a mechanical control unit provided with a return means such that the forces are small in neutral positions and increase rapidly upon operation.

More precisely the invention relates to a control system intended for the choice and selection of functions in a vehicle. The system comprises a case, a lever extending along a main axis, from a first end, inside the case and mounted pivoting about a pivot axis, to a second end outside the case and provided with an actuation knob. The lever can also turn about the main axis. The system also comprises an elastic return device cooperating with the lever so that, following a pivoting of the lever this returns by itself into a neutral position in which the main axis coincides with a neutral axis. The return device comprises an elastic means cooperating, in an active zone, with an action surface attached to the lever. The action surface comprises a surface in the form of a truncated cone of revolution the axis of the cone being the main axis, the cone being so orientated that, on a pivoting of the lever, the active zone is displaced along a generatrix of the cone moving towards its vertex, the elastic means being more biased than in the neutral position. Thus By such a device of conical surface the forces are advantageously reduced in the neutral position.

Moreover, the action surface can extend perpendicularly to the lever in a flat central disc at the periphery of which the truncated cone of revolution is formed. Thus, on a pivoting of the lever the active zone is displaced up to the flat central disc where it is located when the lever is completely pivoted.

Also, the lever can pivot about two perpendicular axes situated in a plane perpendicular to the neutral axis, the system including a plurality of return devices distributed about the neutral axis. An actuator can be interposed between the elastic means and the action surface, the actuator transmitting the movements of the action surface to the elastic means. Moreover, the lever can translate along the neutral axis. The control system also comprises an electrical switch attached to the bottom of the case and surmounted by another elastic means on which is placed a contactor able to slide along the neutral axis and a first face of which is attached to the said other elastic means and a second face of which, opposite to the first face, has a concave shape in which the first end of the lever is mounted pivotably. Thus, pressure on the knob causes a translation along the neutral axis of the lever and of the contactor and biasing of the said other elastic means and electrical switching of the switch. The biasing of the said other elastic means producing a return force tending to oppose the translation.

Also, the control system can include a transmission joint having a tubular base able to turn about the neutral axis and a head provided with an axial orifice. The head is pivoting relatively to the base, the contactor is situated in the tubular base and the lever passes through the joint from one side to the other. The axial orifice has a cross-section complementary to that of the lever and thus the head is attached to the lever in rotation and in pivoting, while in translation the lever is free to slide through the head and through the base. The system is also provided with a device for indexing the rotation of the lever about the neutral axis being linked to the base, the device comprising a notched surface being displaced relatively to an index on rotation of the lever. The action surface of the elastic return device forms part of the head of the joint.

The lever extends outside the case through an opening in the shape of a cross so that the pivotings of the lever are limited by the branches of the cross. Thus, the cross offers the advantage of simpler function selection without risk of confusion.

The control system includes a device limiting in the neutral position the possibility of rotation of the lever about the main axis, this then coinciding with the neutral axis. This limiting device comprises a first toothed surface attached to the lever and a second toothed surface attached to the case, the toothed surfaces being distant one from the other in the neutral position, the lever being then able to turn about the neutral axis, and the toothed surfaces, meshing with each other on a pivoting of the lever, the pivoted lever not being able to turn about the main axis.

Also, in the neutral position the faces of the case and of the knob facing one another are distant one from the other so that the knob can be depressed in the direction of the case. In the pivoted position of the lever, the faces of the case and of the knob facing one another are in contact one with the other so that the knob cannot be depressed in the direction of the case. The non-combination of the functions is an advantage in that it represents a considerable simplification for the user.

BRIEF DESCRIPTION OF DRAWINGS

An embodiment of the invention is now described by means of the following figures.

DETAILED DESCRIPTION

Figure 1:
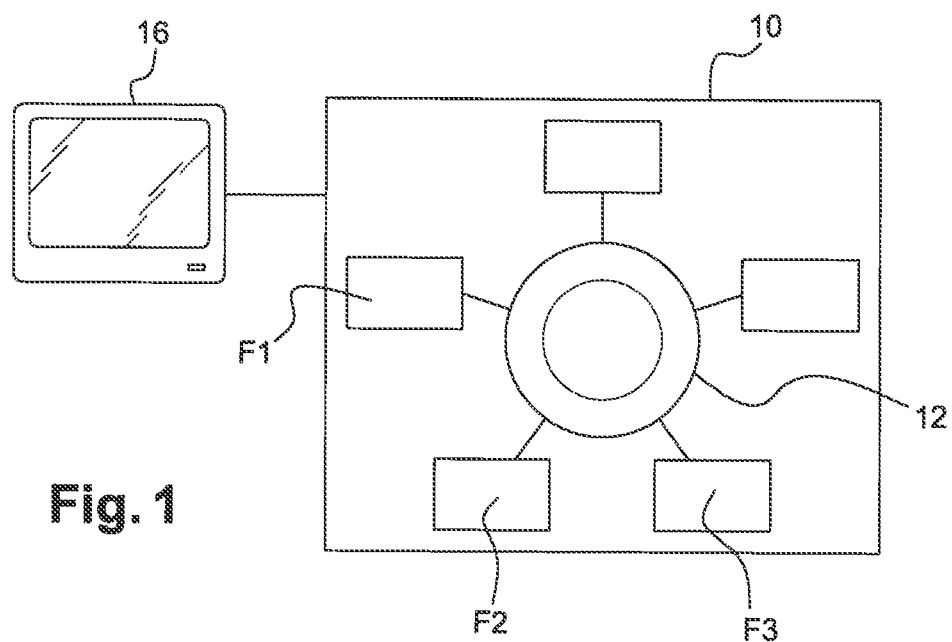
FIG. 1 is a block diagram describing the control system as a whole.

A control system 10 such as shown diagrammatically in FIG. 1 allows a user who acts on a knob 12 linked to a case 14 to act on various functions F1, F2, F3 . . . of the vehicle. The user can observe the state of the controls F1, F2, F3 . . . on a monitoring screen 16.

Figure 2:
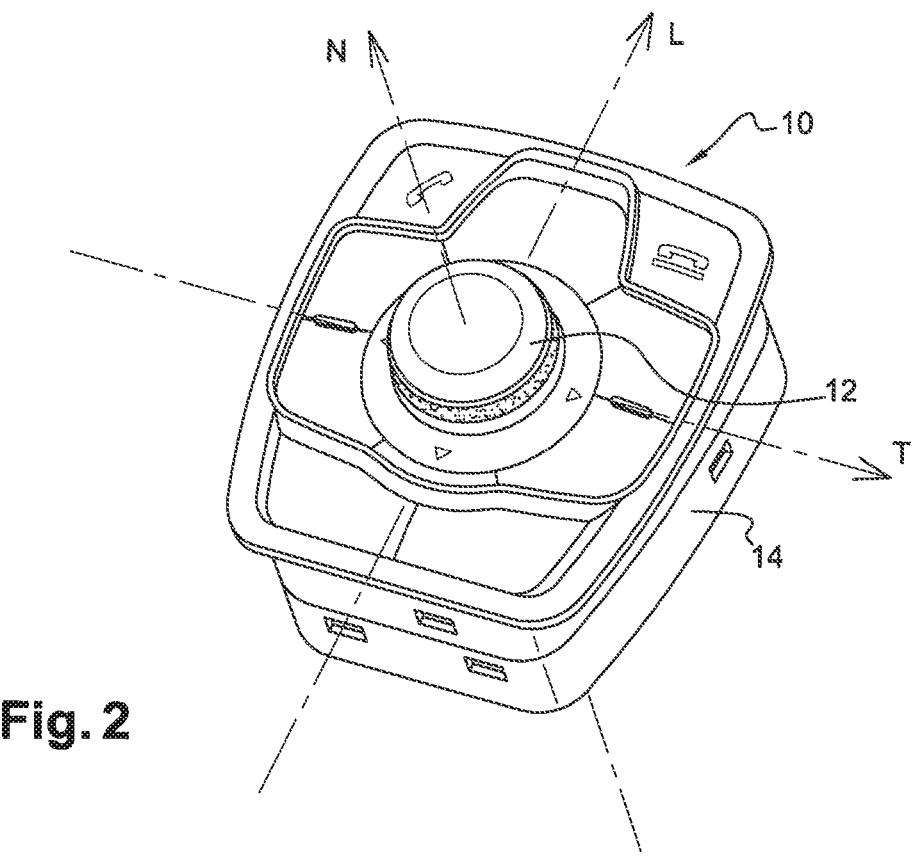
FIG. 2 is an overall view of a control system including a central knob in accordance with the invention and peripheral buttons.

The control system 10 formed in accordance with the invention is presented in FIG. 2. The knob 12, accessible to an occupant, is orientated depending on the chosen location in the vehicle.

FIG. 2 shows the system 10 referenced in a system of straight perpendicular axes comprising a longitudinal axis L, a transversal axis T and a neutral axis N fixed relative to the case 14. The knob 12 is shown surrounded by buttons for selection of specific controls. Alternatively, the system 10 can have no buttons and only comprise the knob 12.

Figure 3:
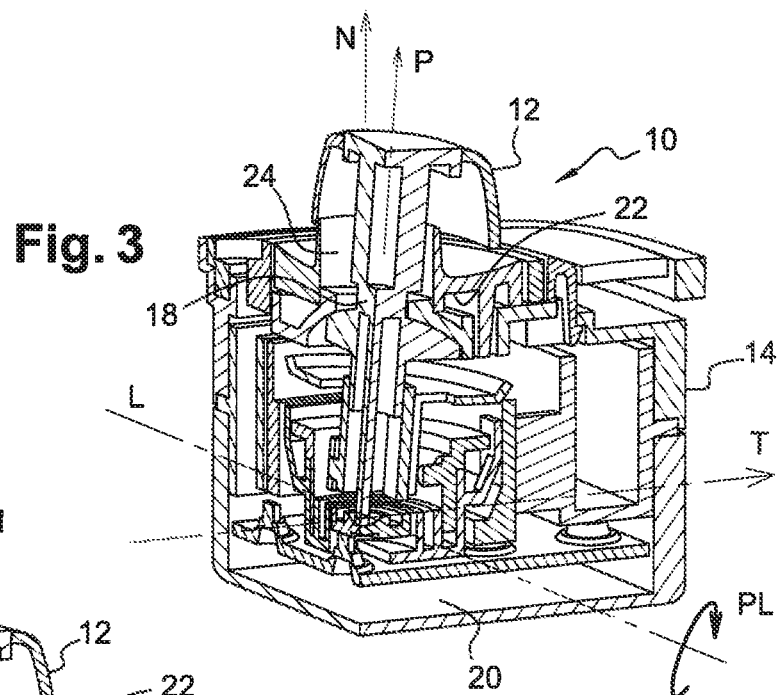
FIG. 3 shows a pivoting of the lever knob assembly about one of the longitudinal or transversal axes.
Figure 4:
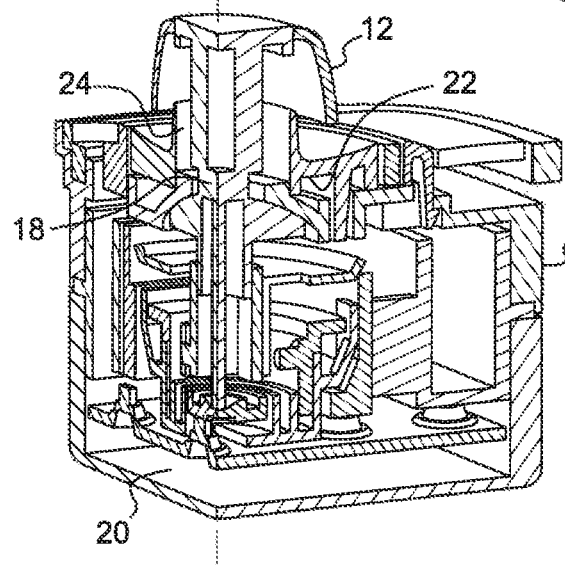
FIG. 4 shows the main rotation of the knob about the main axis.
Figure 5:
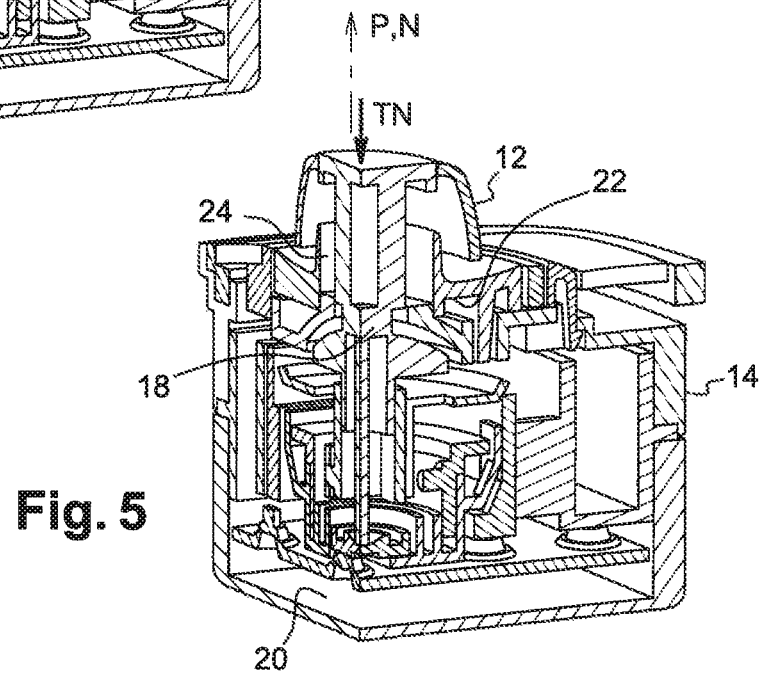
FIG. 5 shows the vertical translation of the knob.

As shown by the succession of FIGS. 3, 4 and 5, and without detailing the structure of the system 10, the knob 12, mounted at the end of a lever 18 can from a neutral position PN in which the main axis P of the lever 18, and of the knob 12, coincides with the neutral axis N, be displaced relatively to the case 14 along the longitudinal axis L in a longitudinal pivoting PL, and similarly along the transversal axis T in a transversal pivoting PT—FIG. 3—it can also be turned on itself about the main axis P in a main rotation RP—FIG. 4—it can lastly be depressed towards the case 14 in a translation TN along the neutral axis N—FIG. 5.

Figure 6:
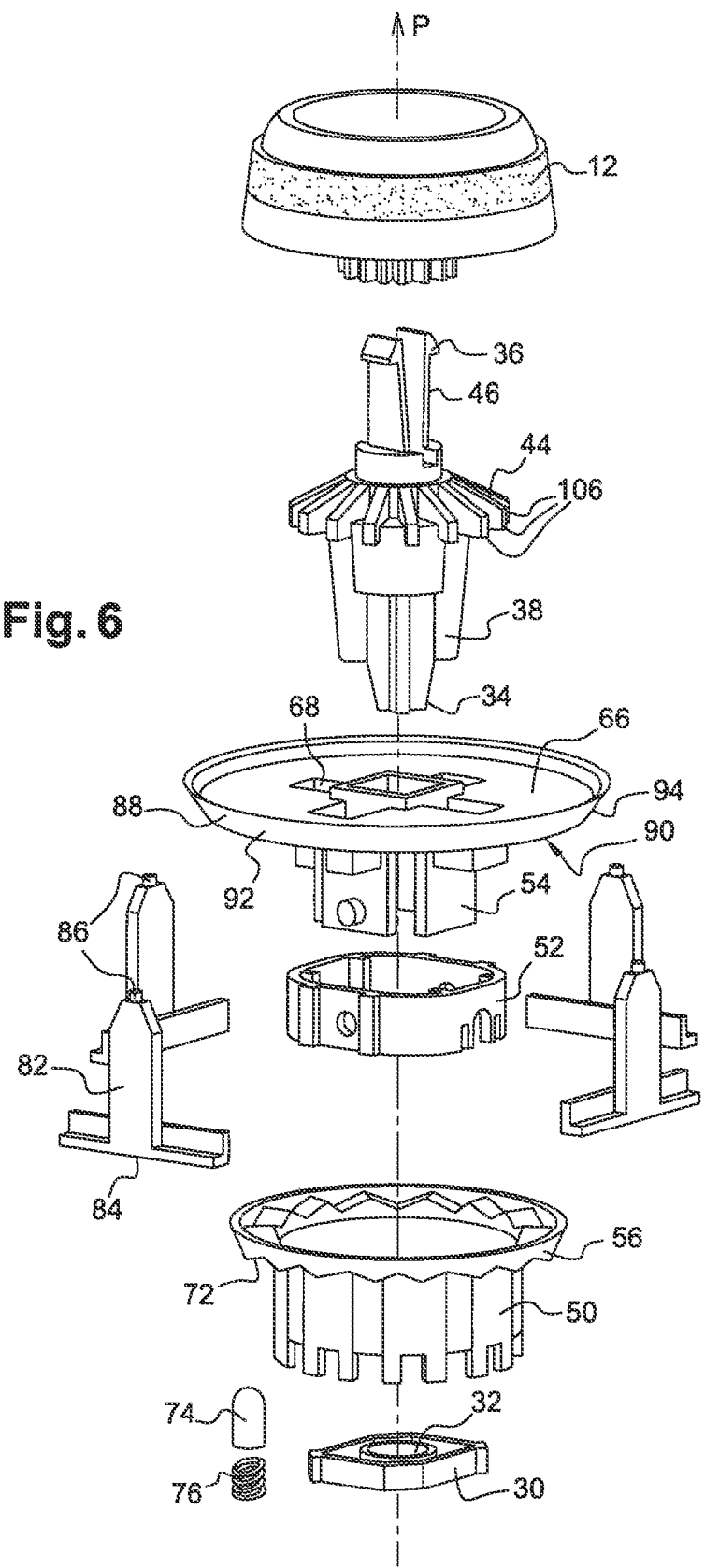
FIG. 6 is an exploded view of the structure of the control system.
Figure 7:
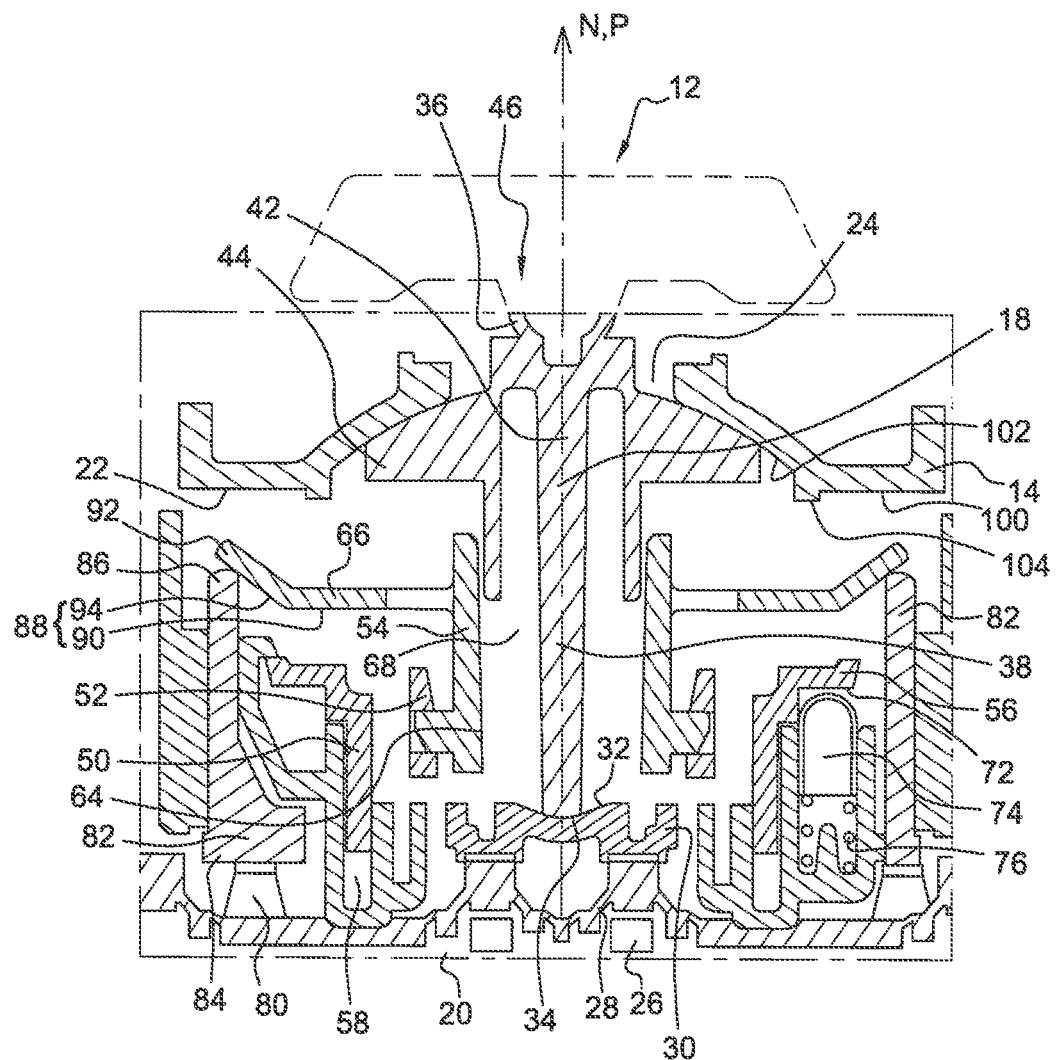
FIG. 7 is a section along the main axis of the control system.
Figure 8A:
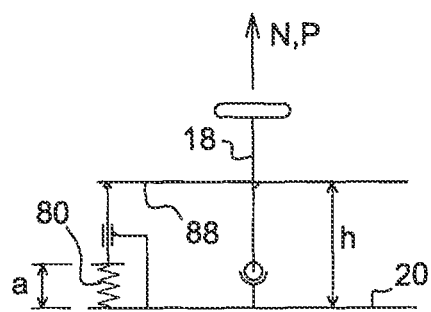
FIG. 8 is a series comprising the operating diagrams 8a, 8b, 8c, 8d, and 8e, that present two embodiments known as with a flat surface and with a conical surface, the system being in the neutral position and then in the sloped position. Diagram 8e details the resolution of the forces associated with the embodiment with a conical surface.
Figure 8B:
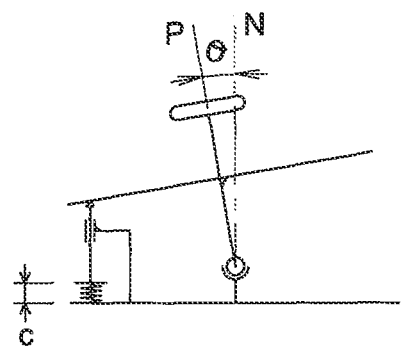
Figure 8C:
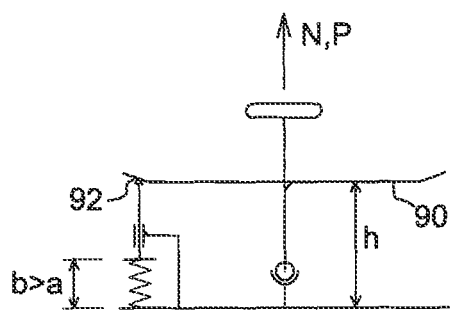
Figure 8D:
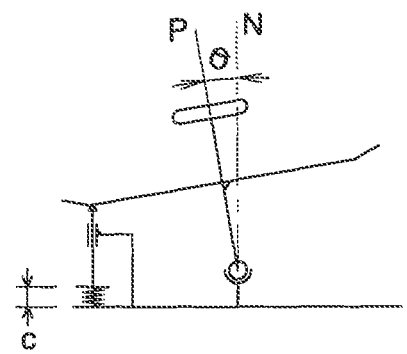
Figure 8E:
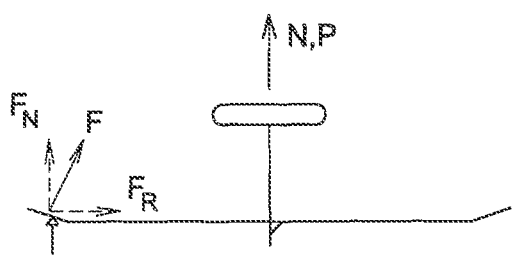

FIG. 6 is an exploded view that shows the pieces of the system 10 associated with the displacements of the knob 12 and, FIG. 7 is a section of the assembled system.

For the sake of clarity and simplification we will use an orientation from bottom to top such as in FIG. 6, the knob 12 being "at the top" of the system 10. Thus, the terms "bottom", "top", "above", "below", "upper", "lower", as well as "horizontal" and "vertical" will be used in the description without thereby limiting the invention, in particular in relation to possible installations of the system 10 in the vehicle. The longitudinal L and transversal T axes then define a "horizontal" plane and the neutral axis N is "vertical".

The case 14 comprises a bottom 20 distant from an upper wall 22 provided with an opening 24. On the horizontal bottom 20 of the case 14 is fixed a printed circuit including an electrical switch 26 covered with a deformable dome 28 acting as a first elastic means. As shown in FIG. 7, the system 10 can include two switches 26, or more than two, each covered by a deformable dome 28. Alternatively, the dome 28 could be replaced by a helical spring or any other elastic means as long as it would provide a force along the neutral axis N when it is compressed along this neutral axis N. Advantageously, the dome or domes can be integrated in a sheet covering the printed circuit. On the dome 28 is placed a contactor 30 mounted slidingly along the neutral axis N so that a pressure on the contactor 30 compresses the dome 28 and toggles the switch 26 between an open state and a closed state. The lower face of the contactor 30 is provided with slightly hollow spaces in which are housed the vertices of the domes 28. Thus, the contactor 30 is held in place without risk of displacement relatively to the domes 28. The upper face of the contactor 30 has a concave central shape 32 acting as a pivot point for a lever 18.

The lever 18 extends along the main axis P from its bottom end 34, in contact in the concave central shape 32, to its top end 36 attached to the knob 12. From the bottom end 34, the lever 18 comprises a bottom part 38 the cross-section of which is in the shape of a cross, then it comprises a central part 42 provided with a collar 44 and lastly a top part 46, which leaves the case 14 through the opening 24, and which is attached to the knob 12.

The system 10 also includes a universal joint comprising a base 50 a body 52 and a head 54. The base 50, situated closest to the bottom 20, comprises a bottom part in the form of a cylindrical tube and a top part that extends horizontally forming a disc 56. The bottom part is placed in a cylindrical housing 58 attached to the bottom 20, and is guided there in rotation about the neutral axis N. Arms 60 extending from the bottom 20 of the case 14 and to curved ends 62 being positioned on top of the edges of the disc 56 thus preventing the base 50 from being displaced upwardly. Thus guided by the female cylinder 58 and held by the arms 60, the base 50 is only free, relatively to the case 14, to turn about the neutral axis N. The body 52 of the universal joint is a tubular ring provided at its periphery with conventional means of articulation forming two axes perpendicular to each other, the one permitting pivoting articulation of the body 52 relative to the base 50, and the other pivoting articulation of the head 54 relative to the body 52, the base 50 and the head 54 being provided with complementary means of the pin-eye or other type. From its articulation with the body 52, the head 54 extends upwardly in a tubular part 64 then an upper part that widens radially such as a disc 66. The head 54 is provided with an axial orifice 68 extending from bottom to top and the cross-section of which is a female cross-complementary to the cross-section of the lever.

Alternatively, to the universal joint, other types of transmission joint could be used such as tripods, flexible joints or any other means fulfilling the function of transmission of the rotation while permitting angulation of the ends.

In place, the lever 18 passes through the universal joint. It can slide freely in it while a rotation of the lever 18 drives the head 54. Let us note in particular that due to the universal joint, the longitudinal PL and transversal PT pivotings of the lever 18 cause pivoting of the head 54 without the base 50 moving while a main rotation RP of the lever 18 causes the rotation of the head 54 and consequently of the whole of the transmission joint. Alternatively, to the solution of complementary sections in the shape of a cross, other shapes, provided they are not circular, would allow the same effect of driving in rotation and free axial sliding to be obtained such as square, triangular, star-shaped . . . sections.

The system 10 is provided with a means for indexing of the main rotation RP of the lever 18. For this purpose, the lower face 72 of the horizontal disc 56 of the base 50 is radially notched while in a housing of the case 14 provided for this purpose, an index 74 with a semi-spherical tip is mounted slidingly along the neutral axis N and is pressed against the notched face 72 by a spring 76. Thus, stopped, the tip of the index 74 is naturally housed in the hollow between two teeth of the notched face 72 and the base 50 is held in position and on a rotation of the base 50, the index 74 is displaced relatively to the notched face 72 from teeth to teeth transmitting a small cyclic force. Alternatively, to the index 74, a ball can be used. Similarly, the orientation of the index 74, here vertical and under the notched disc 72, can easily be chosen differently.

The system 10 is moreover provided with an elastic return device that forces the lever 18 to return to and remain in the neutral position PN when it is not pivoted by a user. For this purpose, a second elastic means 80 is mounted on the bottom 20 of the case 14 or on the printed circuit. It comprises four deformable domes 80 made of plastics, (only two are visible in FIG. 7), the four domes being uniformly distributed about the lever 18. Four follower actuators 82 extend vertically between a bottom end 84 bearing on one of the domes 80 and a top end 86 in contact with the lower surface, or action surface 88, of the disc forming the upper part 66 of the head 54 of the universal joint. The place on the action surface 88 where the actuator 82 is in contact is called the active zone 92 of the action surface 88. The longitudinal PL and transversal PT pivotings of the head 54 cause tilting of the action surface 88 one side of which dips towards the bottom 20 and pushes on the nearest follower actuator 82 thereby compressing an elastic dome 80, while the opposite side rises. This deformation of the elastic dome 80 generates a force $F_N$ that tends to cause the joint and the lever 18 to return to the neutral position PN.

In order to reduce the forces in the neutral position PN, while retaining a considerable force in the pivoted position, the preferred embodiment is to form the action surface 88 provided with a conical peripheral zone 94 the vertex of which is directed downwardly.

FIG. 8 shows in detail in five diagrams the differences between an entirely flat action surface 88—diagrams 8a and 8b—and an action surface 88 with a conical periphery 94—diagrams 8c and 8d.

In the configuration with an entirely flat action surface 88, in the neutral position PN (8a) the surface 88 is at a distance "h" from the bottom 20 and the dome 80 has a size "a". When the lever 18 is pivoted by an angle θ° (8b) the dome 80 is compressed to the size "c".

In the configuration of an action surface 88 with a conical periphery 94, in the neutral position PN (8c) the active zone 92 is situated at the conical periphery 94 at a distance from the bottom 20 greater than the preceding distance "h" and this due to the slope of the cone. This difference results in a lesser compression of the dome 80, which then has a size "b" greater than the preceding size "a". When the lever 18 is pivoted by the angle θ° (8d) the action zone 92 is displaced along a generatrix of the cone 94 until it is at the limit of the conical zone 94 or until it meets the flats zone, the dome 80 then being, as before, compressed to the size "c". Thus, due to the conical periphery 94, in the neutral position PN, the domes 80 are less compressed and the system 10 is stressed by lesser forces, while in the sloped position, the compression of the domes is identical and the return forces are identical to those of the flat action surface 88.

Diagram 8e shows a resolution of the forces caused by a dome 80 when the system 10 is in the neutral position PN and the action surface 88 is at the conical periphery 94. The force F, caused by the compression of the dome 80 and transmitted by the actuator 82 to the active zone 92, has a vertical component $F_N$ and a centripetal radial component $F_R$. Taking into account the four actuators 82 uniformly distributed about the lever 18, the radial components $F_R$ oppose each other. Only the vertical components $F_N$ retain an action on the lever 18.

Taking this resolution into account the action force on the lever is less than the action that the forces would have on a flat action surface.

Alternatively, to this description of the elastic return device, simple alternatives can easily be thus adapted; the actuator could without difficulty bear on the top of the case and not on the bottom, thus compressing a dome placed at the top of the case. In this inverted configuration, the action surface would be the top surface of the upper part of the joint head and the conical periphery would have its vertex directed upwardly. Similarly, the plastics domes are preferred embodiments but elastic means such as helical or leaf springs providing the required return force are also possible. Moreover, to balance the system four actuator-dome assemblies have been described. It is obvious that the balance sought can be the fruit of another number of actuators.

The lever 18 of the system 10 described hereabove is pivotably connected to the contactor 30 which itself is sliding relative to the case 14. The lever 18 therefore has four degrees of freedom with regard to the case 14. It can pivot about the longitudinal axis L, pivot about the transversal axis T, turn about the main axis P and translate along the neutral axis N, in particular downwardly to compress the dome 28 by means of the contactor 30. Nothing in this assembly limits the combination of the movements. The lever 18 can therefore pivot "slantwise" both about the longitudinal and transversal axes, while turning on itself and being depressed.

It can be artificially selected to limit the combinations of the movements. A choice in this direction that is not limiting in design is now presented and described.

To prevent the combination of the pivotings, the opening 24 is given the shape of a multi-branched cross, here with four branches at right angles along the longitudinal L and transversal T axes. Thus, like a manual gear lever constrained to follow an H in its displacements, the lever 18 can now only be displaced following one of the branches of the cross, i.e. either in the longitudinal pivoting PL or in the transversal pivoting PT. The combination of the pivotings is not possible. Alternatively, other shapes of opening 24 are possible providing other limitations. Thus, stars with 6 or 8 branches would allow certain pivoting combinations.

To prevent the combination of a pivoting with the main rotation RP, the lever 18 is provided with the collar 44 which extends radially and faces the internal face 100 of the upper wall 22 of the case 14 which locally has the shape of a dome 102 against which the collar 44 can slide. The collar 44 is toothed on its upper face and the dome 102 is provided at its periphery with teeth 104. In the neutral position PN, the collar 44 is centered in the dome 102, the teeth 106 of the collar 44 are distant from the teeth 104 of the case 14. In the pivoted position, the teeth 106 of the collar 44 engage with the teeth 104 of the upper wall 22 preventing any main rotation RP of the lever 18. Thus, the main rotation RP of the lever 18 is only possible in the neutral position PN. Alternatively to the toothed collar and to the dome also provided with teeth, other systems for locking rotations can be created for example at the head of the transmission joint the tiltings of which can prevent the main rotation, or else directly under the knob in an interface between the knob and the case.

The translation of the knob 12 can be limited to the neutral position PN and prevented when the lever 18 is pivoted. For this purpose, in the neutral position PN, the portion of the upper face of the case 14 that is facing the lower face of the knob 12 is slightly distant from this. Thus, it is possible to press on the knob 12, which can be depressed towards the case 14, the lever 18 translating along the neutral axis N. In the pivoted position of the lever 18, the portion of the upper face of the case 14 which is then facing the lower face of the knob 12 is slightly raised towards the knob 12 so that the latter is flush with the case 14 or even comes into contact with it. Thus, in the pivoted position the translation of the knob 12 and of the lever 18 is made impossible.

From the technical point of view the lever 18 and the knob 12 can only be displaced relative to the case 14 in the longitudinal PL and transversal PT pivotings and the main rotation RP and in the main translation TP. The maximum amplitude of the pivotings is limited, in particular by the size of the opening 24, to less than 10° of angle. Thus from the point of view of the user, these rotations are perceived as being small translations of the knob 12 along the longitudinal L and transversal T axes. Moreover, the main translation TP is limited to a depression of less than 5 millimeters of the knob towards the case 14 like the depression of a computer keyboard key. The main rotation RP, for its part, is unlimited.

Other choices are possible, in particular in the amplitudes of the displacements, these choices offering the user different sensations.

The system 10 described in accordance with the invention is advantageously made of molded plastics pieces and respects a maximum torque of 5 N.cm at the main rotations RP of the knob 12. For this purpose the surface states of the pieces in friction are treated and the plastics used chosen so as to minimize friction.

The invention claimed is:

1. A control system intended for the choice and selection of functions in a vehicle, the system comprising:
 a case;
 a lever configured to extend along a main axis from a first end to a second end, said first end located inside the case, and mounted to pivot about a pivot axis, said second end located outside the case and provided with an actuation knob, the lever also being able to turn about the main axis;
 an elastic return device configured to cooperate with the lever so that, following a pivoting and releasing of the lever, the lever returns to a neutral position where the main axis coincides with a neutral axis, wherein said elastic return device comprises
 an elastic means that includes an active zone configured to cooperate with an action surface attached to the lever, wherein
 the action surface comprises a surface in the form of a truncated cone of revolution aligned with the main axis, the cone being so that in response to pivoting of the lever, the active zone is displaced along a generatrix of the cone towards a vertex of the cone, the elastic means being more biased than in the neutral position; and
 a device limiting in the neutral position the possibility of rotation of the lever about the main axis, this then coinciding with the neutral axis, wherein said device includes a first toothed surface attached to the lever and a second toothed surface attached to the case, the toothed surfaces being distant one from the other in the neutral position, the lever then being able to turn about the neutral axis, and the toothed surfaces engaging with each other on a pivoting of the lever, the pivoted lever not being able to turn about the main axis.

2. The control system as described in claim 1, wherein the action surface extends perpendicularly to the lever in a flat central disc at the periphery of which is formed the truncated cone of revolution so that, on a pivoting of the lever the active zone is displaced up to the flat central disc where it is located when the lever is entirely pivoted.

3. The control system as described in claim 1, wherein the lever is configured to pivot about two perpendicular axes situated in a plane perpendicular to the neutral axis, and the system includes a plurality of return devices distributed about the neutral axis.

4. The control system as described in claim 1, wherein each return device comprises an actuator interposed between the elastic means and the action surface, and the actuator communicates movements of the action surface to the elastic means.

5. The control system as described in claim 1, wherein the lever is further configured to translate along the neutral axis.

6. The control system as described in claim 5 comprising in addition
- an electrical switch attached to the bottom of the case and surmounted by another elastic means on which is placed a contactor able to slide along the neutral axis and a first face of which is attached to the said other elastic means and a second face of which, opposite to the first face, has a concave shape in which the first end of the lever is mounted pivoting, so that
- a pressure on the knob causes a translation along the neutral axis of the lever and of the contactor and a biasing of the said other elastic means and an electrical switching of the switch,
- the biasing of the said other elastic means generating a return force tending to oppose the translation.

7. The control system as described in claim 1 comprising in addition
- a transmission joint having a tubular base able to turn about the neutral axis and a head provided with an axial orifice, the head being pivoting relatively to the base, the contactor being situated in the tubular base and the lever passing through the joint from one side to the other, the axial orifice having a cross-section complementary to that of the lever so that the head is attached to the lever in rotation and in pivoting, while in translation the lever is free to slide through the head and through the base,
- a device for indexing the rotation of the lever about the neutral axis being linked to the base, the device comprising a notched surface being displaced relatively to an index on rotation of the lever,
- the action surface of the elastic return device forming part of the head of the joint.

8. The control system as described in claim 1, wherein the lever extends out of the case through an opening in the shape of a cross so that pivotings of the lever are limited by the branches of the cross.

9. The control system as described in claim 1, wherein
- in the neutral position the faces of the case and of the knob facing each other are distant one from the other so that the knob can be depressed in the direction of the case, and
- in the pivoted position of the lever, the faces of the case and of the knob facing one another are in contact one with the other so that the knob cannot be depressed in the direction of the case.

* * * * *